(12) United States Patent
Yao et al.

(10) Patent No.: US 6,632,849 B1
(45) Date of Patent: Oct. 14, 2003

(54) POROUS CARBONIZED FILM AND PROCESS FOR ITS PRODUCTION

(75) Inventors: Shigeru Yao, Ichihara (JP); Shyusei Ohya, Ichihara (JP); Yukihiko Asano, Ichihara (JP)

(73) Assignee: UBE Industries, Ltd., Yamaguchi (JP)

( * ) Notice: Subject to any disclaimer, the term of this patent is extended or adjusted under 35 U.S.C. 154(b) by 0 days.

(21) Appl. No.: 09/578,781

(22) Filed: May 25, 2000

(30) Foreign Application Priority Data

May 27, 1999 (JP) .......................................... 11-148174

(51) Int. Cl.⁷ .......................... B29C 65/00; C01B 31/26
(52) U.S. Cl. .................. 521/64; 423/445 R; 423/447.2; 423/447.4; 423/447.7; 423/447.8; 264/44; 264/43; 521/61
(58) Field of Search ........................ 521/64; 423/445 R, 423/447.2, 447.4, 447.7, 447.8

(56) References Cited

U.S. PATENT DOCUMENTS 4,839,219 A * 6/1989 Uekita et al. ............... 528/348
6,399,669 B1 * 6/2002 Suzuki et al.

FOREIGN PATENT DOCUMENTS

| JP | 9-148490 | 6/1997 |
|---|---|---|
| JP | 10-5521 | 1/1998 |
| JP | 10-46484 | 2/1998 |
| JP | 10-99664 | 4/1998 |
| JP | 10-158308 | 6/1998 |
| JP | 10-312778 | 11/1998 |

OTHER PUBLICATIONS

Patent Abstract of Japanese Application No. 08261940.
Patent Abstract of Japanese Application No. 08321870.
Patent Abstract of Japanese Application No. 09124438.
Patent Abstract of Japanese Application No. 07309016.
Patent Abstract of Japanese Application No. 08167945.
Patent Abstract of Japanese Application No. 08200842.

* cited by examiner

*Primary Examiner*—Morton Foelak
(74) *Attorney, Agent, or Firm*—Morgan, Lewis & Bockius LLP

(57) ABSTRACT

A porous carbonized film with fine continuous pores, obtained by carbonization of a highly heat-resistant resin porous film in an anaerobic atmosphere, and a process for its production.

12 Claims, 7 Drawing Sheets

POROUS CARBONIZED FILM AND PROCESS FOR ITS PRODUCTION

BACKGROUND OF THE INVENTION

1. Field of the Invention

The present invention relates to a porous carbonized film with fine continuous pores and to a process for its production, and more particularly it relates to a porous carbonized film useful for purposes that require heat resistance, flexibility and mechanical strength, such as inorganic material carriers, micro-filtration filters, bug filters, heat sinks, heat exchangers, thermal radiators, adsorption films, reinforcing materials and the like, and to a process for production of a porous carbonized film that comprises carbonizing a porous film made of a highly heat resistant resin.

2. Description of the Related Art

Techniques have been proposed in recent years for carbonizing polymer films for use as carbonized films. It has become common to employ cellulose, thermosetting resins, pitch tar and the like as the precursor materials.

Japanese Unexamined Patent Publication No. 10-99664 discloses a carbonized film suitable for gas separation, prepared by carbonizing various aromatic polymers, wherein a cardo polymer is employed as the separating film.

Recently carbonized films have come into common use as heating elements and heat sinks. For example, Japanese Unexamined Patent Publication No. 10-312778 discloses a high-efficiency thermal radiator in which a carbonized film having straight pores is used. Japanese Unexamined Patent Publication No. 9-148490 discloses a circuit board made of a carbon material with excellent heat radiating properties. Japanese Unexamined Patent Publication No. 10-158308 discloses a heat-resistant bug filter for gas-phase polymerization. Japanese Unexamined Patent Publication No. 10-5521 discloses a filter element made of polyimide fibers that exhibits satisfactory strength and durability. Further, Japanese Unexamined Patent Publication No. 10-46484 discloses a heat-resistant porous paper sheet.

The aforementioned carbonization process involving carbonization from a cardo polymer is appropriate for separation of gas components, but it gives a small pore diameter and is therefore not suitable for filters and radiating films.

On the other hand, bug filters made of heat-resistant fibers or nonwoven fabrics have a mesh size of about 10 μm or greater even when especially fine, and they therefore present the risk of inclusion of fiber scrap as contaminants when gases pass therethrough. It is therefore not suitable for purposes requiring micro-filtration. In addition, most organic fibers have thermal restrictions, and therefore their uses are limited.

For these reasons, it has been desired to develop a carbonized film with high heat resistance and low contamination.

Furthermore, adsorption films that have appropriate activity or that carry active adsorbing agents require large adsorption areas.

One process for production of the aforementioned carbonized films has been a process of carbonization by heating an organic polymer at high temperature in an anaerobic atmosphere, but this has a disadvantage in that the carbonization rate is low for carbonization of most organic polymers.

In contrast, aromatic polyimides of aromatic polymers attain a high carbonization rate and readily retain their pre-carbonization form. By selection of the carbonization temperature it is also possible to produce carbonized films with various properties. It is thereby possible to provide amorphous carbonized films or porous graphite films.

However, carbonization of aromatic polyimide films has not allowed their use as filters or adsorption films.

BRIEF SUMMARY OF THE INVENTION

It is an object of the present invention to provide a porous carbonized film with fine continuous pores, and a process for its production.

The invention provides a porous carbonized film with fine continuous pores, obtained by carbonization of a highly heat-resistant resin porous film in an anaerobic atmosphere.

The invention further provides a process for production of a porous carbonized film with fine continuous pores, that comprises heating a highly heat-resistant resin porous film at 800° C. or higher in an anaerobic atmosphere for carbonization.

Throughout the present specification, "continuous pores" will refer to so-called open pores that extend from either desired surface to the other surface with the fine pores forming channels, and the fine pores are preferably non-linear and follow a tortuous course.

DETAILED DESCRIPTION OF THE INVENTION

Figure 1:
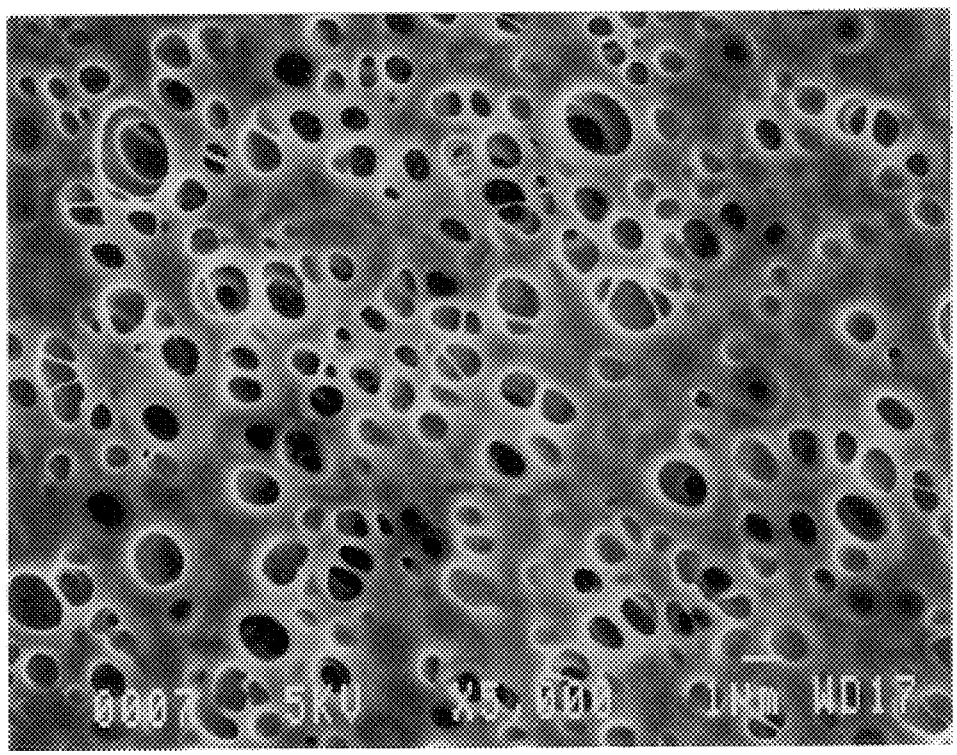
FIG. 1 is a scanning electron microscope photograph of the surface of the porous carbonized film obtained in Example 1.

Modes for carrying out the present invention will now be described.

The invention includes the following embodiments.

1) The aforementioned porous carbonized film wherein the highly heat-resistant resin porous film and the carbonized film have continuous pores with a mean pore size of 0.1–10 μm.

2) The aforementioned porous carbonized film wherein the highly heat-resistant resin porous film is made of a polyimide.

3) The aforementioned production process for a porous carbonized film, wherein the heating temperature is 800–1800° C.

4) The aforementioned production process for a porous carbonized film, wherein further heating is carried out at a temperature in the range of 1800–2900° C.

5) The aforementioned production process for a porous carbonized film, wherein further heating is carried out at a temperature in the range of 2900–3500° C.

6) The aforementioned production process for a porous carbonized film, wherein heating is carried out under tension or heating is carried out while applying pressure perpendicular to the film surface.

7) The aforementioned production process for a porous carbonized film, wherein the highly heat-resistant resin porous film is obtained by casting a solution comprising a polyimide precursor into a film shape, contacting it with a coagulating solvent through a solvent exchange rate regulator to precipitate the polyimide precursor, to obtain a fine continuous pore polyimide precursor porous film, and then subjecting the polyimide precursor porous film to heat imidation or chemical imidation.

The porous carbonized film of the invention has fine continuous pores, and preferably has continuous pores with a mean pore size of 0.1–10 μm. With a mean pore size smaller than 0.1 μm, it may not be possible to exhibit the expected function when applied as a filter or a heating element or flexible member. Likewise, if the mean pore size exceeds 10 μm, the function as a porous carbonized film may not be achieved. The mean pore size of the porous carbonized film of the invention may be adjusted by changing the polyimide film pore size or the heating temperature for the carbonization. At least some of the fine pores must be continuous pores.

The anaerobic atmosphere for the carbonization must contain no oxidation active gases such as oxygen, and suitable anaerobic gases include argon, helium, nitrogen and the like. An argon atmosphere is particularly preferred.

The highly heat-resistant resin for the invention may be a resin made of a highly heat-resistant polymer prepared to a high molecular weight by condensation polymerization and heating of an acid component and a diamine component, a suitable example of which is an aromatic polyimide.

The following explanation assumes the use of an aromatic polyimide as the highly heat-resistant resin.

The porous polyimide film, which is the representative type of highly heat-resistant resin porous film used for the invention, may be produced by the following process, for example.

A cast polyimide precursor solution is contacted with a coagulating solvent through a solvent exchange rate regulator to precipitate the polyimide precursor and form pores therein, after which the pore-formed polyimide precursor film is subjected to heat imidation or chemical imidation to produce a porous polyimide film.

The polyimide precursor is a polyamic acid or partially imidated form thereof, obtained by polymerization of a tetracarboxylic acid component and a diamine component, preferably an aromatic monomer, and it can give a polyimide resin by heat imidation or chemical imidation for ring closure. The polyimide resin is a heat resistant polymer with an imidation ratio of at least about 50%, preferably at least about 75% and especially at least 90%.

The organic solvent used as the solvent for the polyimide precursor may be parachlorophenol, N-methyl-2-pyrrolidone (NMP), pyridine, N,N-dimethylacetamide, N,N-dimethylformamide, dimethylsulfoxide, tetramethylurea, phenol, cresol or the like.

The tetracarboxylic acid component and aromatic diamine component are dissolved in roughly equimolar amounts in the organic solvent for polymerization, to produce a polyimide precursor with an inherent viscosity (30° C., concentration: 0.5 g/100 mL NMP) of 0.3 or greater, and especially 0.5–7. When the polymerization is carried out at a temperature of about 80° C. or higher, a partial ring-closure imidated polyimide precursor is obtained.

Preferred examples of the aforementioned aromatic diamine are aromatic diamine compounds represented by the general formula (1)

$$H_2N-R(R_1)_m-A-(R_2)_nR'-NH_2 \quad (1)$$

wherein R and R' are direct bonds or divalent aromatic rings, $R_1$ and $R_2$ are hydrogen or substituents such as lower alkyl, lower alkoxy or halogen atoms, A is a divalent group such as 0, S, CO, $SO_2$, SO, $CH_2$ or $C(CH_3)$, and m and n are integers of 1–4.

As specific aromatic diamine compounds of this type there may be mentioned 4,4'-diaminodiphenylether (hereunder also abbreviated to DADE), 3,3'-dimethyl-4,4'-diaminodiphenylether, 3,3'-diethoxy-4,4'-diaminodiphenylether and para-phenylenediamine (hereunder also abbreviated to p-PDA).

The aromatic diamine component may also be diaminopyridine, and specifically there may be mentioned 2,6-diaminopyridine, 3,6-diaminopyridine, 2,5-diaminopyridine and 3,4-diaminopyridine.

The aromatic diamine component used may also be a combination of two or more of the aforementioned aromatic diamines.

As a suitable tetracarboxylic acid component there may be mentioned biphenyltetracarboxylic acid components, preferred examples of which include 3,3'4,4'-biphenyltetracarboxylic dianhydride (hereunder also abbreviated to s-BPDA) and 2,3,3',4'-biphenyltetracarboxylic dianhydride (hereunder also abbreviated to a-BPDA), but 2,3,3',4'- or 3,3',4,4'-biphenyltetracarboxylic acid or 2,3,3',4'- or 3,3',4,4'-biphenyltetracarboxylic acid salts or esterified derivatives may also be used. The biphenyltetracarboxylic acid component may also be a mixture of any of the aforementioned biphenyltetracarboxylic acids and their derivatives.

The tetracarboxylic acid component may be a tetracarboxylic acid such as pyromellitic acid, 3,3',4,4'-benzophenonetetracarboxylic acid, 2,2-bis(3,4-dicarboxyphenyl)propane, bis(3,4-dicarboxyphenyl)sulfone, bis(3,4-dicarboxyphenyl)ether, bis(3,4-dicarboxyphenyl)thioether or their acid anhydrides, salts or esterified derivatives. A portion of these aromatic tetracarboxylic acid components may be replaced with aliphatic tetracarboxylic acids such as butanetetracarboxylic acid, or their acid anhydrides, salts or esterified derivatives, in a proportion of no more than 10 molar percent, and preferably no more than 5 molar percent, with respect to the total tetracarboxylic acid component.

The tetracarboxylic acid component may also be a mixture of any of the aforementioned tetracarboxylic acids and their derivatives.

The polyimide precursor is dissolved in the organic solvent in a proportion of 0.3–60 wt %, and preferably 1–30 wt %, to prepare a polyimide precursor solution (the organic solvent may also be added, or the polymerization solution itself may be used). If the polyimide precursor proportion is less than 0.3 wt %, the film strength may be unsuitably lowered when the porous film is formed, and if it is greater than 60 wt % the solution viscosity may be too high, thus being difficult to obtain a homogeneous solution, for which reasons the proportion range given above is preferred. The solution viscosity of the prepared polyimide precursor solution may be 10–10,000 poise, and preferably 40–3000 poise. If the solution viscosity is lower than 10 poise the film strength may be unsuitably lowered when the porous film is formed, and if it is higher than 10,000 poise it may be difficult to cast it into a film, and therefore the above range is preferred.

In addition, there may be added a filler such as fibers, powder, fabric or the like. For example, carbon fibers, glass fibers, silicon nitride fibers, metal fibers, graphite powder, or silicon nitride, boron nitride, quartz carbon fiber fabric or the like may be added. These additives and reinforcers may be appropriately added to the polyimide precursor solution in a range that does not inhibit the function of the porous carbonized film of the invention.

The polyimide precursor solution is cast into a film as a cast product, and is coated on at least one side with a solvent exchange rate regulator to make a laminated film. The method used to obtain the cast laminated film of the polyimide precursor solution is not particularly restricted, and the method used may be one in which the polyimide precursor solution is cast onto a base consisting of a plate made of glass or the like or a moving belt after which the cast surface is covered with the solvent exchange rate regulator; one in which the polyimide precursor solution is thinly coated onto the solvent exchange rate regulator by a spray method or doctor blade method; or one in which the polyimide precursor solution is extruded through a T-die and sandwiched between solvent exchange rate regulators to obtain a three-layer laminated film with the solvent exchange rate regulator on both sides.

The solvent exchange rate regulator preferably has a degree of permeability allowing the polyimide precursor solvent and the coagulating solvent to permeate at an appropriate rate when the multilayer film is contacted with the coagulating solvent to precipitate the polyimide precursor. It is particularly preferred for the resistance to passage of air to be 50–1000 seconds/100 cc, and especially 250–800 seconds/100 cc. The film thickness of the solvent exchange rate regulator may be 5–500 $\mu$m and preferably 10–100 $\mu$m, and pores with a mean size of 0.1–10 $\mu$m, and especially 0.2–2 $\mu$m, that are continuous in the direction of the film cross-section, are preferably dispersed at a sufficient density. If the film thickness of the solvent exchange rate regulator is smaller than the above range, the solvent exchange rate will be too fast, not only resulting in formation of a dense layer on the precipitated polyimide precursor surface but also at times resulting in creation of wrinkles upon contact with the coagulating solvent, whereas if it is greater than the above range, the solvent exchange rate will be slower, resulting in a non-uniform pore structure formed inside the polyimide precursor.

The solvent exchange rate regulator may be, specifically, a nonwoven fabric or porous film using as the material a polyolefin such as polyethylene or polypropylene, or cellulose, Teflon or the like; a polyolefin fine porous film is particularly suitable for use since it will give the resulting polyimide porous film with the surface of excellent smoothness.

The laminated layer cast polyimide precursor is contacted with the coagulating solvent through the solvent exchange rate regulator to precipitate and form pores in the polyimide precursor. The coagulating solvent of the polyimide precursor may be a non-solvent for the polyimide precursor, such as an alcohol such as ethanol or methanol, or acetone, water or the like, or else a mixed solvent comprising 99.9–50 wt % of such a non-solvent with 0.1–50 wt % of a solvent for the polyimide precursor. There are no particular restrictions on combinations of a non-solvent and solvent, but a mixed solvent comprising a non-solvent and a solvent is preferred for the coagulating solvent because it can give a uniform porous structure to the precipitated polyimide precursor.

The pore-formed polyimide precursor film is then subjected to heat imidation or chemical imidation. Heat imidation of the polyimide precursor film may be accomplished by using a pin, chuck or pinch roll to anchor the solvent exchange rate regulator-removed polyimide precursor porous film to prevent heat shrinkage, and heating it in air at 280–500° C. for 5–60 minutes.

Chemical imidation of the polyimide precursor porous film may be accomplished by using an aliphatic acid anhydride or aromatic acid anhydride as a dehydrating agent, and using a tertiary amine such as triethylamine as the catalyst. Imidazole, benzimidazole or substituted derivatives thereof may also be used, as described in Japanese Unexamined Patent Publication No. 4-339835.

Chemical imidation of the polyimide precursor porous film is preferred for production of the polyimide porous film with a laminated layer structure. For a laminated layer polyimide porous film, for example, the cast polyimide precursor solution may be precipitated and rendered porous, and the resulting porous precursor film formed into laminated layers and finally subjected to chemical imidation to produce a laminated layer polyimide porous film.

The imidation ratio of the polyimide porous film that has been heat treated or chemically treated is preferably 50% or greater, especially 75% or greater, and most preferably 90% or greater. The imidation rate is preferably not too low, as the film shrinkage may be too severe, during carbonization of the porous film, making it impossible to maintain its shape, or the pores may become closed off during carbonization.

The polyimide porous film produced in this manner may have a porosity of 10–85%, preferably 30–85% and especially 40–70%, a mean pore size of 0.1–10 $\mu$m, preferably 0.1–5 $\mu$m and more preferably 0.1–1 $\mu$m, with a maximum pore size of 10 $\mu$m, although these will differ somewhat depending on the production conditions. If the porosity is too low, the effective area of the carbonized film will be reduced, resulting in poor adsorption efficiency or poor filtration efficiency if it is used as a filter, so that the desired function may not be exhibited. If the porosity is too high, the mechanical strength may be undesirably lowered. If the mean pore size is smaller than 0.1 $\mu$m the filtration efficiency may be lowered in the case of use as a filter, and if the mean pore size is larger than 10 $\mu$m the fine particle collecting efficiency, etc. may be no longer exhibited, and therefore neither situation is preferred.

In order to obtain a porous carbonized film according to the invention, the porous polyimide film may be heated and carbonized in an anaerobic atmosphere at a temperature of 800° C. or higher, preferably 800–3500° C. Here, the treatment is preferably carried out while accompanying the heating with application of tension or with application of pressure perpendicular to the film surface.

The anaerobic atmosphere must be free of oxidation active gases such as oxygen, and suitable anaerobic gases include argon, helium and nitrogen. An argon atmosphere is particularly preferred.

The carbonization of the precursor is preferably carried out under a gas stream of an inert atmosphere gas, in order to smoothly remove the decomposition products and prevent reprecipitation of the decomposition products once they have evaporated.

The porous polyimide is preferably subjected to gradual carbonization, because if the decomposition products suddenly escape, the carbon portion will dissipate, which is undesirable since this will lower the carbonization rate and also tend to produce defects in the structure. For this reason, the temperature elevating rate is preferably no greater than 20° C./min, and a sufficiently slow temperature elevating rate of about 1–10° C./min is especially preferred.

The carbonization treatment is preferably carried out while accompanying the heating with application of tension or with application of pressure perpendicular to the film surface, as mentioned above, and this inhibits shrinkage during the carbonization and allows the precursor to become more readily oriented during the carbonization, thus providing a carbonized film with greater strength. This also yields a graphite structure with a high degree of crystallization.

As the method of applying pressure perpendicular to the film surface, it is suitable to sandwich it between heat-resistant porous sheets or film sheets while heating, in order to set the shape of the carbonized film. For example, it may be sandwiched between silicon nitride sheets or carbonized films.

For continuous treatment, the method may involve application of tension between rolls under heat, or the method may be a biaxial stretching procedure that includes pulling between rolls while applying tension with a pin tenter.

According to the invention, a porous polyimide film with continuous pores having a mean pore size of preferably 0.1–10 µm may be heated in an anaerobic atmosphere at a temperature of 800–1800° C. to produce a porous carbonized film.

When carbonization is carried out to this temperature, it is possible to obtain a nearly amorphous carbonized product or one with a degree of crystallization of no greater than 20%. It can be employed for such purposes as circuit boards, various types of heat sinks, filters, inorganic material carriers and the like.

According to the invention, a porous carbonized film can also be produced by heating a porous polyimide film with continuous pores have a mean pore size of preferably 0.1–10 µm in an anaerobic atmosphere at a temperature of 800–1800° C. as described above, and then further heating it in an anaerobic atmosphere at a temperature of 1800–2900° C.

When carbonization is carried out in this temperature range, it is possible to obtain a carbonized product with an intermediate degree of crystallization. Porous carbonized films having a graphite structure with a crystallization degree of approximately 20–40% can be obtained. These can be employed for such purposes as heat conductors and electrical conductors in various electrical instruments.

According to the invention, a porous carbonized film can also be produced by heating a porous polyimide film with continuous pores having a mean pore size of preferably 0.1–10 µm in an anaerobic atmosphere at a temperature of 800–2900° C. as described above, and then further heating it in an anaerobic atmosphere at a temperature of 2900–3500° C.

When carbonization is carried out in this temperature range, it is possible to obtain a carbonized product with a high degree of crystallization. While there is no problem with temperatures of above 3500° C., the manageability may sometimes be unstable at above 3500° C., which hampers continuous operation.

The porous carbonized film of the invention has fine continuous pores, and therefore while straight pores would produce no resistance to passage through the film and would permit the full influence (pressure, etc.) of headflow, the curvature of the fine pores provides a buffer function and this, combined with its flexibility and high tensile strength, allows it to be used in filters for micro-filtration or separating filters such as bug filters, in carriers, electrical conductors, heating elements, heat sinks, resin composite reinforcing materials and metal composite reinforcing materials. The porous carbonized film of the invention is particularly suitable as a filter to be used in air at about 800° C. or above. Because it provides both a heat-conductive carbonized film and continuous pores therein, it may also be suitably used as a heat sink for personal computer fans and the like.

Examples and comparative examples will now be provided for a more detailed explanation of the porous carbonized film of the invention, with the understanding that the invention is in no way limited thereto.

Throughout the following examples, the resistance to passage of air, porosity and mean pore size were determined by the methods described below.

[1] Resistance to Passage of Air

This was measured according to JIS P8117.

A B-type Gurley densometer (product of Toyo Seiki Co.) was used as the measuring apparatus.

A sample piece was fastened over a round hole with a diameter of 28.6 mm and an area of 645 mm². The air in the cylinder was forced out through the sample hole using an inner cylinder weight of 567 g. The time to pass 100 ml of air was measured and recorded as the resistance to passage of air (Gurley value).

[2] Porosity

The film thickness and weight of a prescribed cut-out size of the porous film were measured and the porosity was calculated by the following equation (1) based on the weight. In equation 1, S is the porous film area, d is the film thickness, w is the measured weight and D is the polyimide density, where 1.34 was used as the polyimide density.

$$\text{Porosity} = 100 - 100 \times (w/D)/(S \times d) \qquad (1)$$

[3] Mean Pore Size

The pore areas for 50 or more arbitrarily selected openings were measured from a scanning electron microscope photograph of the porous film surface, and the mean diameter based on circular pore shape was calculated according to equation (2) from the average value for the pore area. In equation (2), Sa is the average value for the pore area.

$$\text{Mean pore size} = 2 \times (Sa/\pi)^{1/2} \qquad (2)$$

Reference Example 1

Using s-BPDA as the tetracarboxylic acid component and DADE as the diamine component, with the DADE in a molar ratio of 0.994 with respect to the s-BPDA, these were dissolved in NMP to a total monomer component content of 14 wt % and then polymerized at a temperature of 40° C. for 6 hours to obtain a polyimide precursor. The solution viscosity of the polyimide precursor solution was 200 poise.

The resulting polyimide precursor solution was cast onto a glass plate to a thickness of about 150 µm, and the surface was covered with a polyolefin fine porous film (product of Ube Industries, Ltd.) with a resistance to passage of air of 500 sec/100 cc as a solvent exchange rate regulator, without creating wrinkles. The laminate was immersed in methanol for 5 minutes and the solvent was exchanged through the solvent exchange rate regulator to precipitate a pore-formed polyimide precursor.

After immersing the precipitated polyimide precursor porous film in water for 15 minutes, it was released from the glass plate and solvent exchange rate regulator and then heated in air at 300° C. for 10 minutes while being anchored with a pin tenter. The polyimide porous film formed in this manner had continuous pores in the cross-sectional direction of the film.

Figure 4:
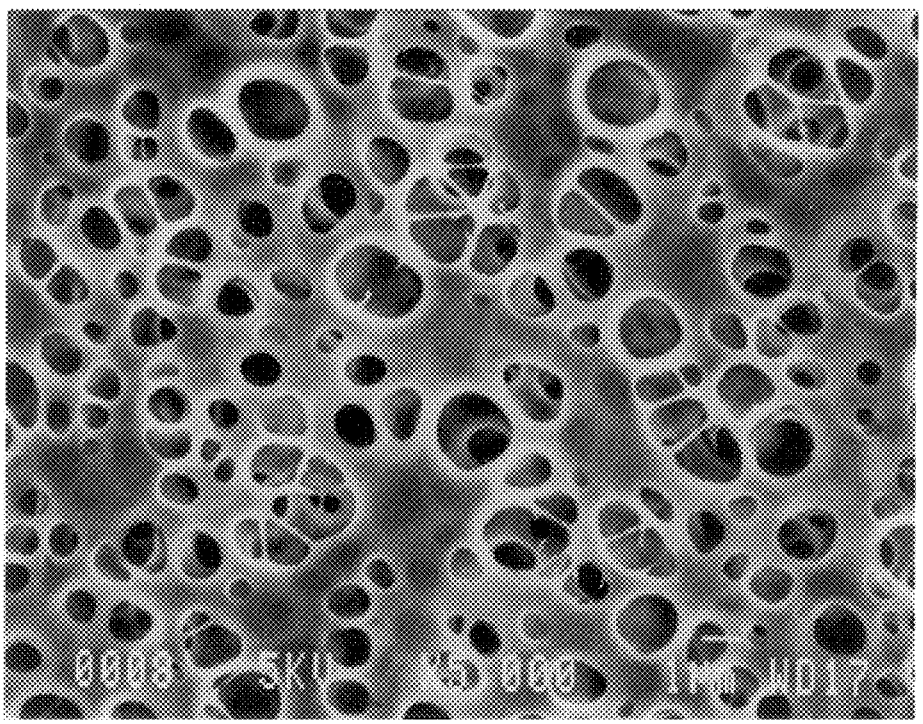
FIG. 4 is a scanning electron microscope photograph of the surface of the porous polyimide film used in Example 1.

The results of measuring the film thickness, resistance to passage of air, porosity and mean pore size of the obtained polyimide porous film are given below. The presence of fine continuous pores in the cross-sectional direction of the film was also confirmed from a scanning electron microscope photograph (SEM photograph) of the surface of the polyimide porous film (FIG. 4) and a scanning electron microscope photograph of the cross-section.

Film thickness: 55 μm
Resistance to passage of air: 220 sec/100 ml
Porosity: 67%
Mean pore size: 0.8 μm

EXAMPLE 1

The aforementioned porous polyimide film was sandwiched on both sides with gas permeable carbon sheets in an argon gas stream, and the temperature was raised from 20° C. to 1000° C. at a temperature elevating rate of 10° C./min and held at 1000° C. for 120 minutes. The outer appearance maintained its shape after cooling. A dull but lustrous porous film was displayed. The porous carbonized film was hard enough to be undamaged by a cutter knife.

Figure 2:
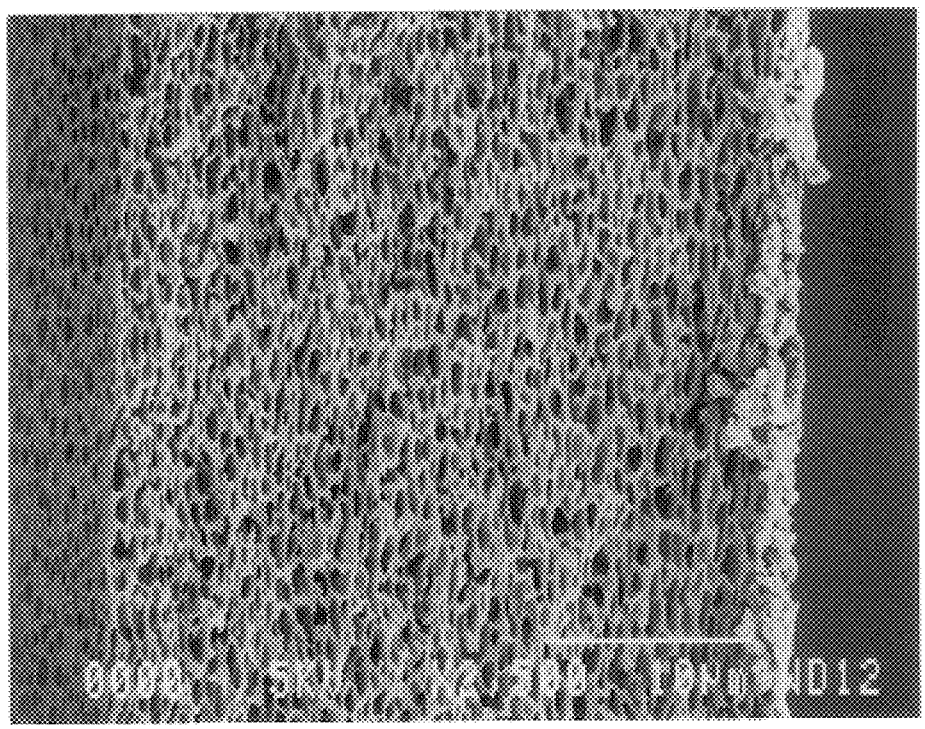
FIG. 2 is a scanning electron microscope photograph of a cross-section of the porous carbonized film obtained in Example 1.
Figure 3:
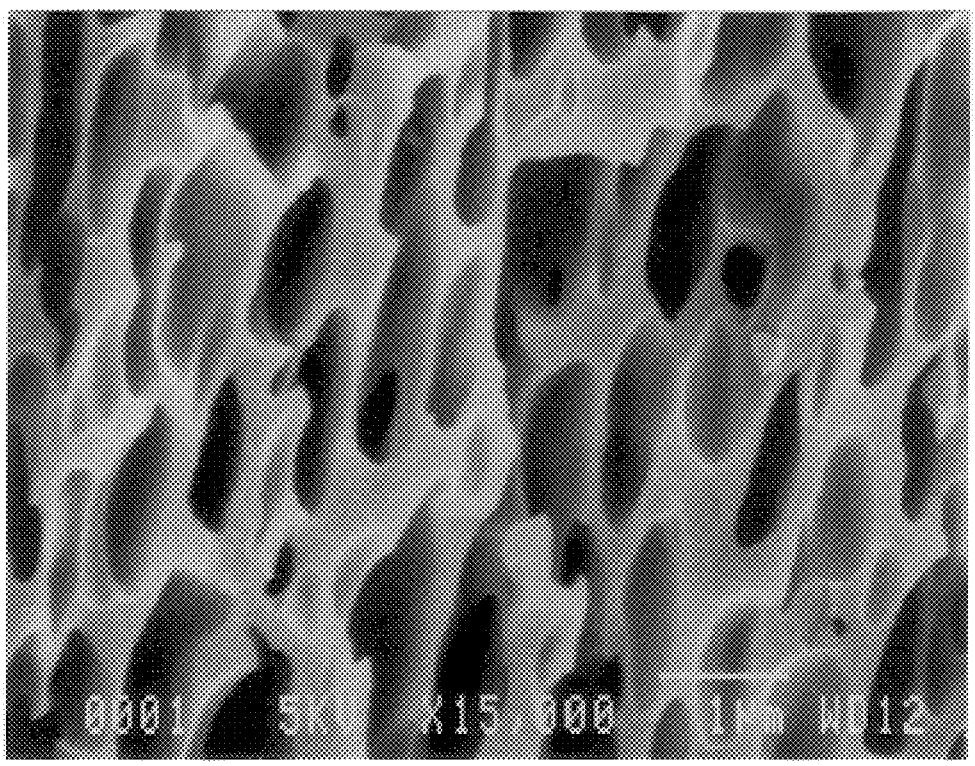
FIG. 3 is a magnified view of FIG. 2.

FIGS. 1–3 shows scanning electron microscope photographs (surface, cross-section, magnified) of the porous carbonized film. The pores were smaller than the pores prior to carbonization, and the mean pore size was 0.6 μm. X-ray diffraction revealed a slightly crystalline phase, and measurement by the Ruland method gave a crystallization degree of 15%. The results seen in the scanning electron microscope photographs of the porous carbonized film and the fact that methanol passed through the porous carbonized film confirmed the presence of fine continuous pores.

EXAMPLE 2

The porous carbonized film of Example 1 was again sandwiched on both sides with gas permeable carbon sheets in an argon gas stream, and the temperature was raised from 20° C. to 2000° C. at a temperature elevating rate of 5° C./min, for carbonization. The resulting porous carbonized film had a dull but lustrous outer appearance. The film was hard, flexible and tough.

Figure 5:
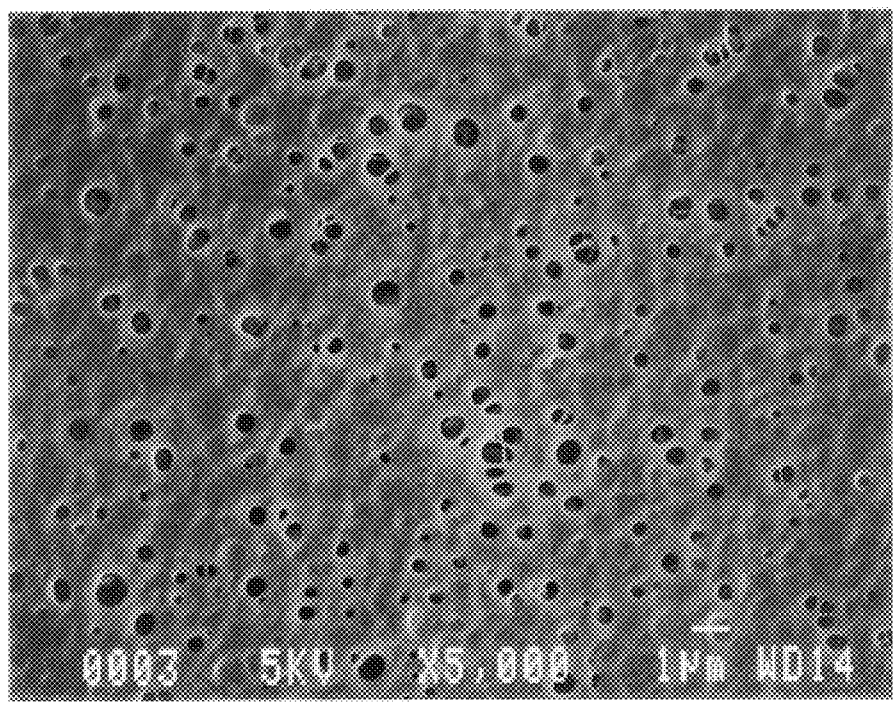
FIG. 5 is a scanning electron microscope photograph of the surface of the porous carbonized film obtained in Example 2.
Figure 6:
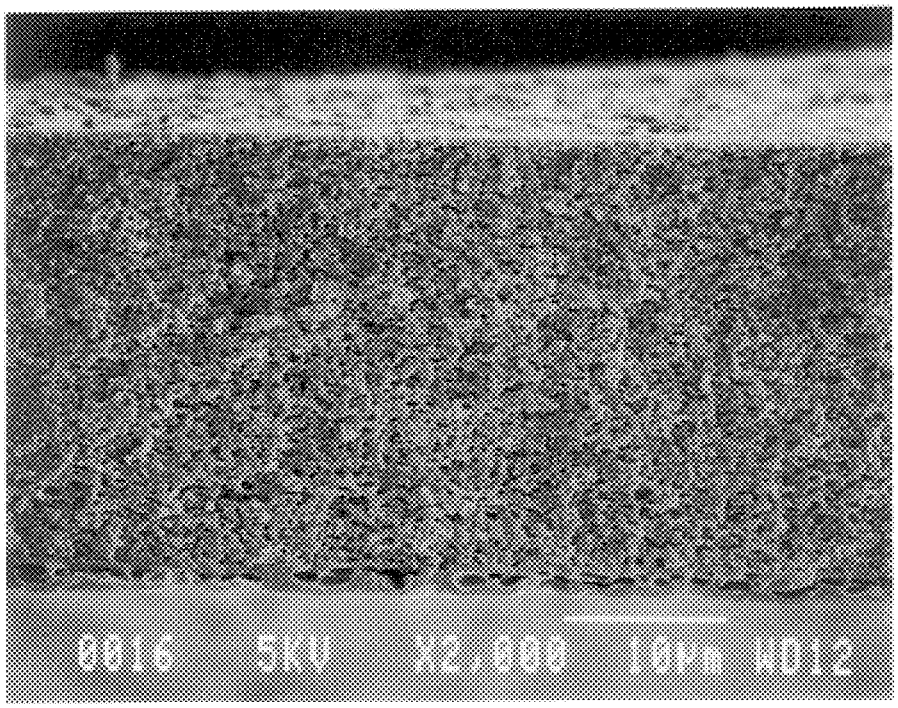
FIG. 6 is a scanning electron microscope photograph of a cross-section of the porous carbonized film obtained in Example 2.
Figure 7:
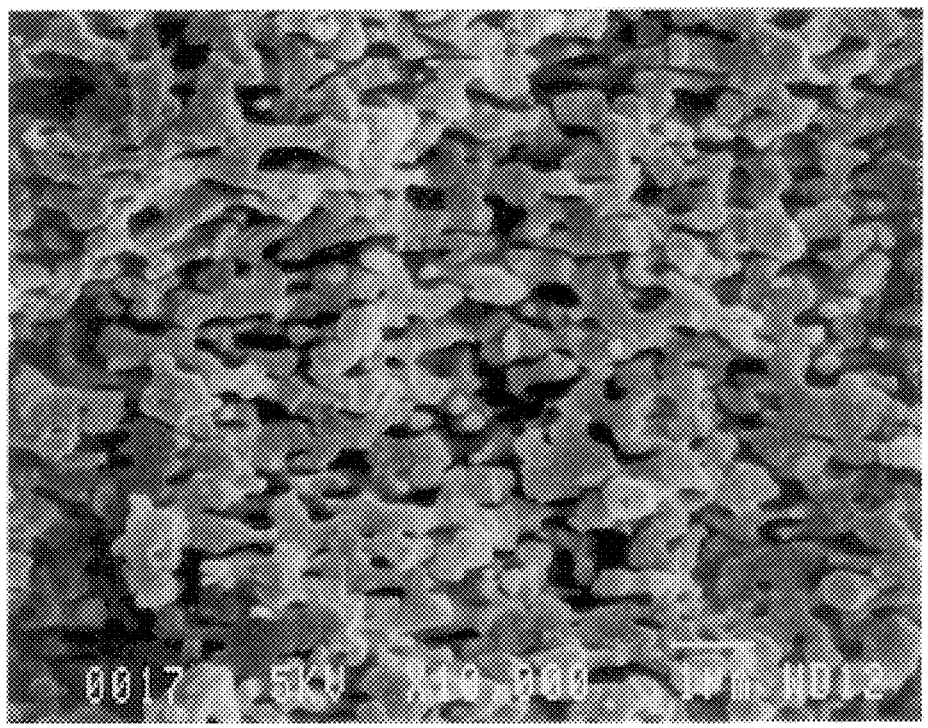
FIG. 7 is a magnified view of FIG. 6.

FIGS. 5–7 show scanning electron microscope photographs (surface, cross-section, magnified) of the porous carbonized film, which revealed that the pores were slightly smaller than the pores prior to carbonization, and the mean pore size was 0.5 μm. The results seen in the scanning electron microscope photographs of the porous carbonized film and the fact that methanol passed through confirmed the presence of fine continuous pores. As a result of measurement by the Ruland method, the crystallization degree was found to be 26%.

Comparative Example 1

A carbonized film was produced by the same process as Example 1, except that no solvent exchange rate regulator was used, and the polyimide film used was dense with no open pores. Although a satisfactory carbonized film was achieved, the surface pores were not open and no passage of methanol or the like was observed, and therefore the film could not be used as a filter.

EXAMPLE 3

The same porous polyimide film as in Example 1 was used, and after carbonization to 1800° C. in an argon atmosphere at a temperature elevating rate of 10° C./min, the temperature was further raised to 3000° C. at 5° C./min and held at a temperature of 3000° C. for 120 minutes.

After cooling, the obtained porous carbonized film had the appearance of a lustrous porous film.

Scanning electron microscope photographs (surface, cross-section, magnified) of the porous carbonized film revealed that the pores were slightly smaller than the pores prior to carbonization, and the mean pore size was 0.2 μm. The results seen in the scanning electron microscope photographs of the porous carbonized film and the fact that methanol passed through confirmed the presence of fine continuous pores. According to X-ray measurement, the crystallization degree was 54%.

EXAMPLES 4–6

Porous carbonized films were obtained in the same manner as in Examples 1–3, except that the polyimide porous films used were formed according to Reference Example 1, but using p-PDA as the diamine component instead of DADE. The porous carbonized films had satisfactory properties equal to or surpassing those of Examples 1–3.

Scanning electron microscope photographs (surface, cross-section, magnified) of the porous carbonized films revealed that the pores were slightly smaller than the pores prior to carbonization, while the results seen in the scanning electron microscope photographs and the fact that methanol passed through confirmed the presence of fine continuous pores.

Incidentally, the porous carbonized films obtained in Examples 1–6 all had tortuous continuous pores.

According to the present invention it is possible to obtain a porous carbonized film with fine continuous pores. More particularly, by varying the carbonization temperature, it is possible to produce a porous carbonized film with excellent heat resistance that can be used for a wide range of purposes, including carriers, filters, electrical conductors, light emitters, reinforcing materials and the like.

What is claimed is:

1. A porous carbonized film with fine pores, obtained by carbonization of a highly heat-resistant resin porous film in an anaerobic atmosphere, wherein the fine pores form channels extending from one surface to the other surface of the film in a non-linear fashion and have a mean open pore size of 0.1 to 10 μm.

2. A porous carbonized film according to claim 1, wherein the highly heat-resistant resin porous film is made of a polyimide.

3. A porous carbonized film according to claim 2, wherein the polyimide is an aromatic polyimide.

4. A process for production of a porous carbonized film of claim 1 comprising heating a highly heat resistant resin porous film at a temperature of at least 800 C. form channels extending from one surface to the other surface of the film, comprising.

5. A process for production of a porous carbonized film according to claim 4, wherein the heating temperature is 800–1800° C.

6. A process for production of a porous carbonized film according to claim 5, wherein further heating is carried out at a temperature in the range of 1800–2900° C.

7. A process for production of a porous carbonized film according to claim 6, wherein further heating is carried out at a temperature in the range of 2900–3500° C.

8. A process for production of a porous carbonized film according to claim 4, wherein heating is carried out under tension.

9. A process for production of a porous carbonized film according to claim 4, wherein the highly heat-resistant resin porous film is obtained by casting a solution comprising a polyimide precursor into a film shape, contacting it with a coagulating solvent through a solvent exchange rate regulator to precipitate the polyimide precursor.

10. A process for the production of a porous carbonized film according to claim 7, wherein heating is carried out under tension.

11. A process for the production of a porous carbonized film according to claim 4, wherein heating is carried out while applying pressure perpendicular to the film surface.

12. A process for the production of a porous carbonized film according to claim 6, wherein heating is carried out while applying pressure perpendicular to the film surface.

* * * * *